United States Patent [19]
Büdecker et al.

[11] 4,344,451
[45] Aug. 17, 1982

[54] PRESSURE RESPONSIVE DISTRIBUTING VALVE DEVICE

[75] Inventors: Lüdwig Büdecker, Frankfurt am Main; Bernd Schütt, Oberursel, both of Fed. Rep. of Germany

[73] Assignee: ITT Industries, Inc., New York, N.Y.

[21] Appl. No.: 169,555

[22] Filed: Jul. 17, 1980

[30] Foreign Application Priority Data

Sep. 6, 1979 [DE] Fed. Rep. of Germany ....... 2935949

[51] Int. Cl.³ .......................................... G05D 15/00
[52] U.S. Cl. .................................... 137/101; 137/115; 137/118
[58] Field of Search ........................ 137/101, 115, 118

[56] References Cited
U.S. PATENT DOCUMENTS

4,014,360  3/1977  Adams ................................. 137/118
4,084,604  4/1978  Budecker et al. .................. 137/118

*Primary Examiner*—William R. Cline
*Attorney, Agent, or Firm*—John T. O'Halloran; Alfred C. Hill

[57] ABSTRACT

The disclosed valve device includes first, second and third user ports. A pressure accumulator connects with the first user port. With the accumulator fully charged, a pressure port connected to a pump communicates with the second user port. With the accumulator evacuated, the pressure port communicates with the first user port. In the event of a fluid demand at the third user port, the pressure port will be connected to the third user via a control valve. The control valve is a non-return valve in a channel connecting the first user port to the third user port, which opens under influence of a pressure in the first user port.

2 Claims, 3 Drawing Figures

PRESSURE RESPONSIVE DISTRIBUTING VALVE DEVICE

BACKGROUND OF THE INVENTION

The present invention relates to a valve device having a pressure port connected to a pump; a first user port which is in communication with a pressure accumulator and a first user component and connectible with the pressure port through a throttle and a check valve; a second user port which is connectible with the pressure port through a by-pass valve, the by-pass valve having a by-pass piston whose effective surface adapted to be subjected to pressure in the opening direction connects with the pressure port and whose effective surface adapted to be subjected to pressure in the closing direction and extending into a control chamber connects with the pressure port through a throttle and an accumulator-pressure-responsive pilot valve when the accumulator pressure is below a predetermined limit, and connects with a return line when the accumulator pressure has reached the predetermined limit; and a third user port to which a third user component is connected with hold positions between two limit positions, the third user port being connectible with the pressure port through a line adapted to be shut off by a control valve whose valve passageway is open when the third user component demands fluid.

A valve device of this type is fully disclosed in the copending application of L. Budecker, Ser. No. 060,946, filed July 26, 1979, whose disclosure is incorporated herein by reference.

SUMMARY OF THE INVENTION

It is an object of the present invention to improve upon the valve device disclosed in the above-cited copending application by simple means such that the energy requirements of the third user component can be satisfied mainly by the pump directly, for instance, with the valve in the position "charge accumulator". With momentarily increased energy requirements which the pump alone cannot meet and in processes in which the valve is in the position "circulate", the available power of the accumulator is also made use of.

A feature of the present invention is the provision of a valve device comprising: a pressure port connected to a pump; a first user port in communication with a pressure accumulator and a first user component, the first user port being connectible to the pressure port through a conduit having a throttle and a first check valve disposed therein; a second user port in communication with a second user component and connectible with the pressure port through a by-pass valve including a by-pass piston having a first effective surface adjacent the pressure port adapted to be subjected to pressure at the pressure port in the opening direction of the by-pass valve and a second effective surface spaced from the first effective surface adapted to be subjected to pressure from the pressure port in the closing direction of the by-pass valve, the second effective surface being disposed in a control chamber, the control chamber being connected to the pressure port through the throttle and an accumulator-pressure-responsive pilot valve when the pressure of the accumulator is below a predetermined limit and to a return line when the pressure of the accumulator reaches the predetermined limit; and a third user port in communication with a third user component requiring a large amount of pressure transmitting fluid and connectible with the pressure port through a control valve whose valve passageway is open when the third user component demands fluid, the control valve being a second check valve disposed in a first channel connecting the first user port to the third user port, the second check valve bein opened by pressure at the first user port when the third user component is operated and pressure in the first channel decreases.

At the same time, the improved valve device results in an improvement in the supply of energy to the third user component without drawing upon reserves which must be kept available for the second user component, for example, the brake system in an automotive vehicle. In an embodiment of this invention, another check valve is provided which opens laterally into the channel on account of the pressure from the pump to which this additional check valve is connected by a channel.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
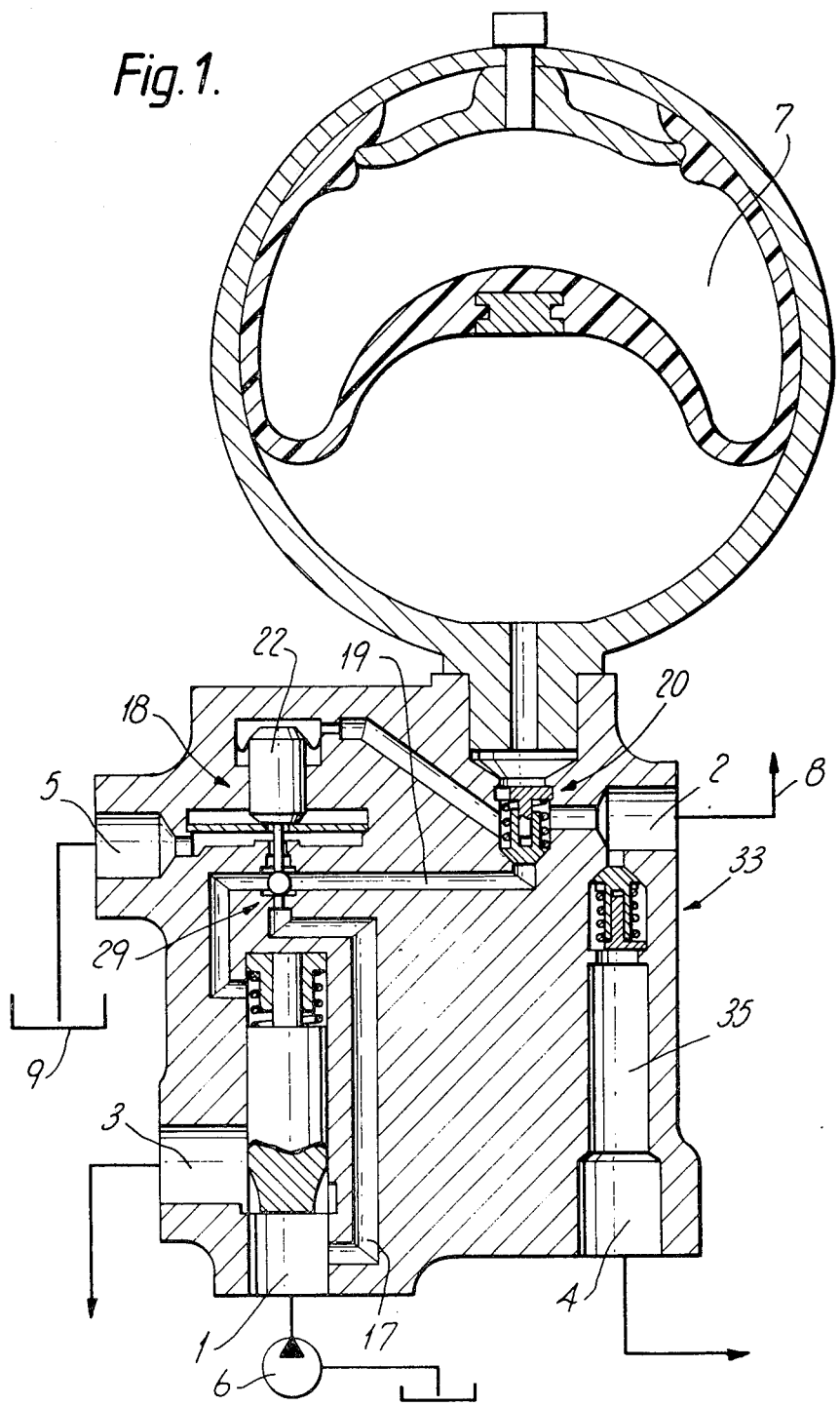
FIG. 1 is a cross sectional view of a first embodiment of a valve device in accordance with the principles of the present invention.
Figure 2:
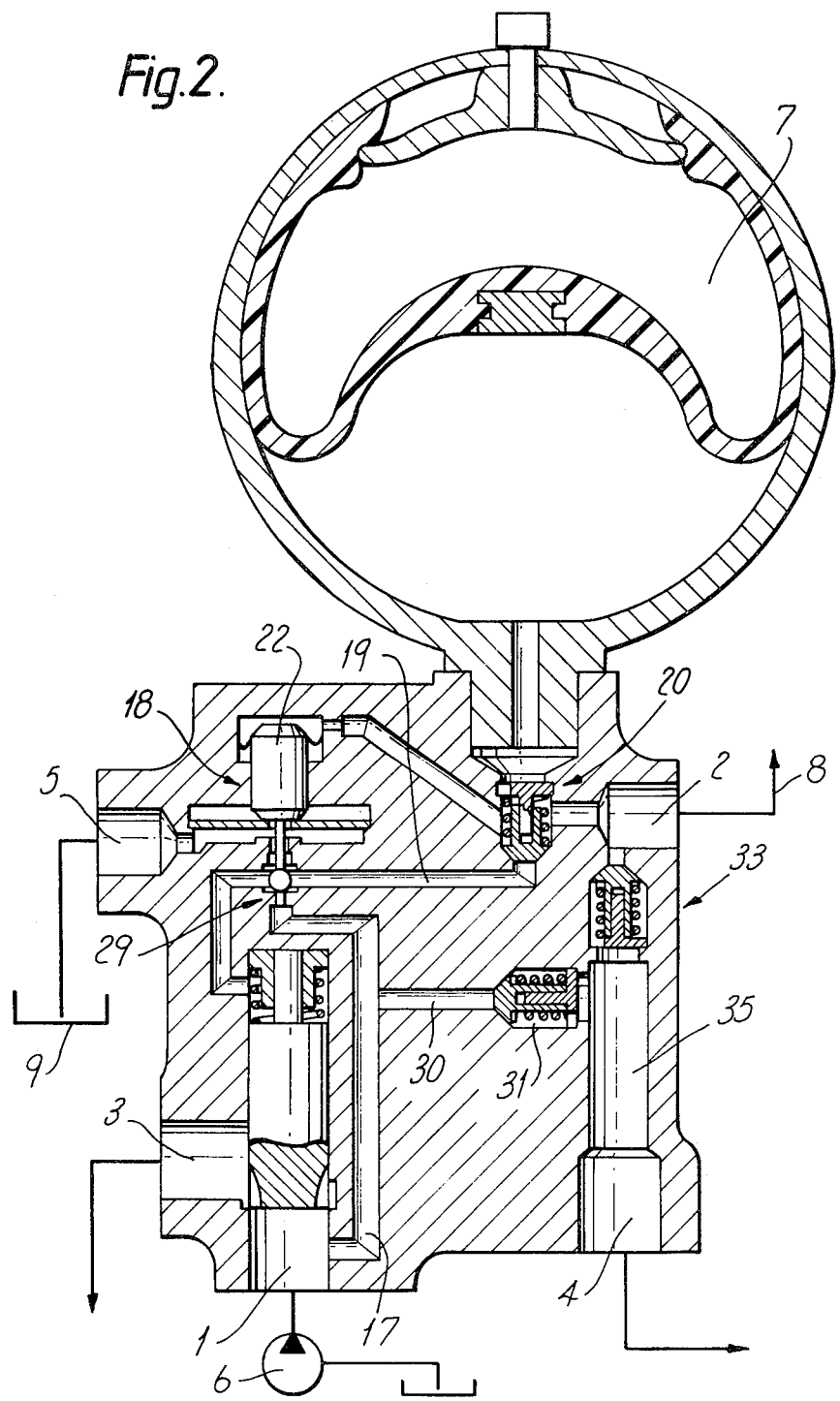
FIG. 2 is a cross sectional view of a second embodiment of a valve device in accordance with the principles of the present invention.
Figure 3:
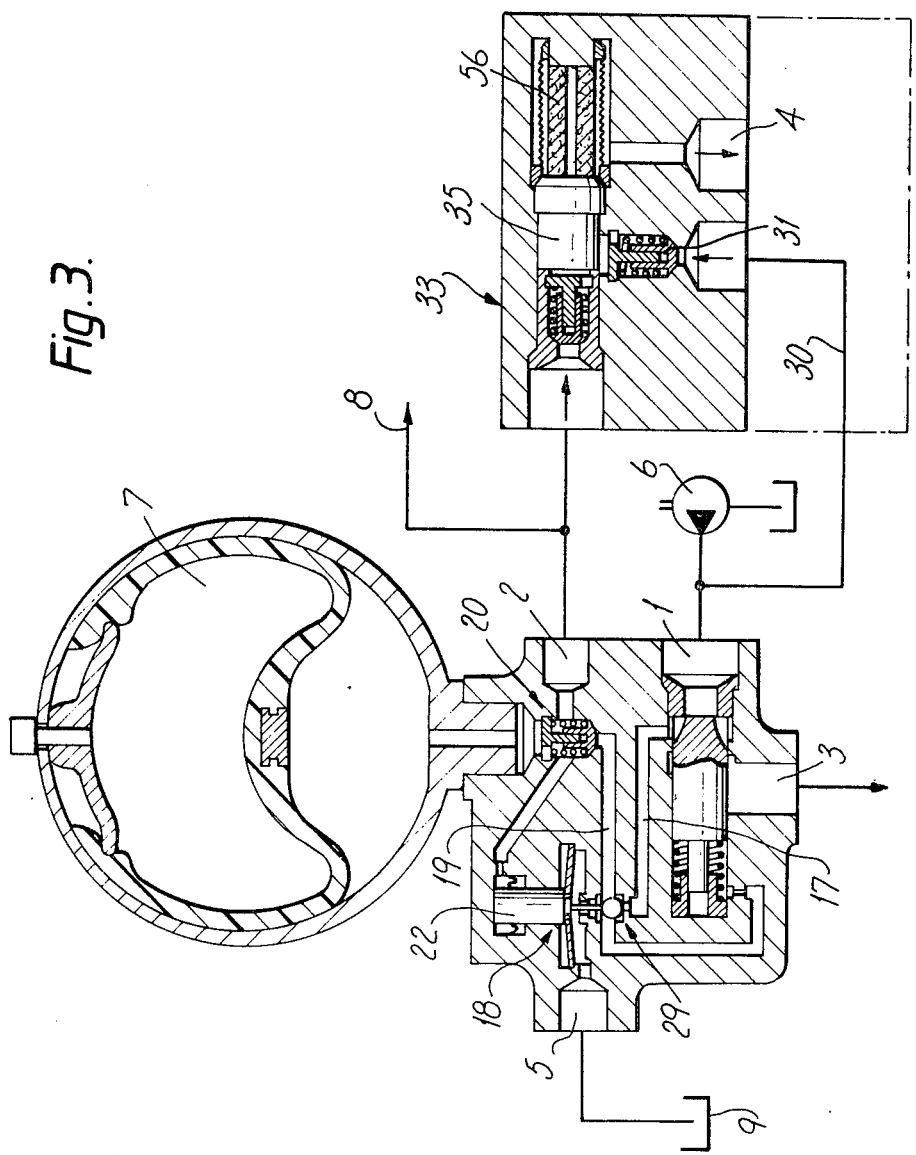
FIG. 3 is a cross sectional view of a third embodiment of a valve device in accordance with the principles of the present invention.

Like parts of FIGS. 1, 2 and 3 are assigned the same reference numerals.

Referring to FIGS. 1, 2 and 3, the valve device has a pressure port 1, a first user port 2, a second user port 3, a third user port 4 and a port 5 leading to a discharge reservoir 9. Connected to pressure port 1 is a fluid pump 6, to first user port 2 a first user component 8 (not shown), for example a vehicle hydraulic brake system, to second user port 3 a conduit leading to a power-assisted device, for example, the vehicle steering system, and to the third user port 4 a vehicle antiskid control system. Connected to the valve device is a pressure accumulator 7 which is permanently connected with the pressurized chamber of control member 22 of a control valve 18 via a check valve 20. Check valve 20 opens as a result of the pressure from a conduit 19 which among others leads to fluid pump 6. Check valve 20 permits at all times free flow of fluid from pressure accumulator 7 through first user port 2 to first user component 8.

In the event of a fall of pressure in pressure accumulator 7 below a predetermined valve, control valve 18 will open valve 19 to permit delivery of fluid from fluid pump 6 through channel 17 and conduit 19 into pressure accumulator 7 to service the first user component.

The valve device disclosed in the above-cited copending application comprises a control valve which is connected to the pressure accumulator via the first user port. From the conduit charging the pressure accumulator with fluid, there branches off another conduit leading to a control valve. This control valve comprisees an operating piston which is axially slidably arranged in a cylindrical bore and divides it into a first and a second chamber. The operating piston is designed as a hollow piston having a bore with a throttle and bears against a compression spring in its cylindrical bore permitting the operating piston to be connected to, or disconnected from, the pump via the pressure-accumulator-charging conduit on account of the pressures acting on its end surfaces.

According to the present invention, a check valve 33 is substituted for the complicated operating piston of the valve device of the above-cited copending application and, as shown in FIGS. 1, 2 and 3, it is inserted into the bore 35 such that it will open under the action of pressure in port 2 connected to first user component 8 if the third user component connected to port 4 opens and the pressure previously prevailing in bore 35 decreases. As a result, fluid will flow from pressure accumulator 7 through check valve 20 which is invariably open in the appropriate direction, through pressure port 2, the new check valve 33 and bore 35, to user port 4 and, thus, to the third user component.

The case may occur that pressure accumulator 7 is not in a position to satisfy the requirements of the third user component. In this case, as shown in FIG. 2, a check valve 31 is provided which is connected to pump 6 through channels 30 and 17, and which is opened by the pump pressure when the pressure in bore 35 drops and control valve 18 is in the position "charge accumulator", enabling fluid to be supplied to the third user component directly through bore 35.

The same arrangement is shown in FIG. 3. The valve device illustrated in FIG. 3 differs from the one of FIG. 2 only in that the newly introduced check valve 33 and check valve 31 are combined to form a self-contained unit to facilitate the assembly of the hydraulic elements. In this unit, a filter 56 is inserted upstream from the third user component which is, for example, the vehicle antiskid control system.

While we have described above the principles of our invention in connection with specific apparatus it is to be clearly understood that this description is made only by way of example and not as a limitation to the scope of our invention as set forth in the objects thereof and in the accompanying claims.

We claim:

1. A valve device comprising:
   a pressure port connected to a pump;
   a first user port in communication with a pressure accumulator and a first user component, said first user port being connectible to said pressure port through a conduit having a throttle and a first check valve disposed therein;
   a second user port in communication with a second user component and connectible with said pressure port through a by-pass valve including a by-pass piston having a first effective surface adjacent said pressure port adapted to be subjected to pressure at said pressure port in the opening direction of said by-pass valve and a second effective surface spaced from said first effective surface adapted to be subjected to pressure from said pressure port in the closing direction of said by-pass valve, said second effective surface being disposed in a control chamber, said control chamber being connected to said pressure port through said throttle and an accumulator-pressure-responsive pilot valve when the pressure of said accumulator is below a predetermined limit and to a return line when the pressure of said accumulator reaches said predetermined limit; and
   a third user port in communication with a third user component requiring a large amount of pressure transmitting fluid on demand only and connectible with said pressure port through a control valve whose valve passageway is open when said third user component demands fluid, said control valve being a second check valve disposed in a first channel connecting said first user port to said third user port, said second check valve being opened by pressure at said first user port when said third user component is operated and pressure in said first channel decreases.

2. A valve device according to claim 1, further including
   a third check valve disposed in a second channel connected between said first channel and said pump, said third check valve being opened by pressure of said pump when pressure in said first channel decreases and said pilot valve is in a "change accumulator" position.

* * * * *